(12) United States Patent
Azgin et al.

(10) Patent No.: US 10,554,555 B2
(45) Date of Patent: Feb. 4, 2020

(54) HASH-BASED OVERLAY ROUTING ARCHITECTURE FOR INFORMATION CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/910,811

(22) Filed: Mar. 2, 2018

(65) Prior Publication Data

US 2018/0191616 A1 Jul. 5, 2018

Related U.S. Application Data

(62) Division of application No. 14/880,780, filed on Oct. 12, 2015, now Pat. No. 9,929,954.

(51) Int. Cl.
| | | |
|---|---|---|
| G06F 21/60 | (2013.01) | |
| H04L 12/743 | (2013.01) | |
| H04L 12/715 | (2013.01) | |
| H04L 12/733 | (2013.01) | |

(52) U.S. Cl.
CPC .......... *H04L 45/7453* (2013.01); *H04L 45/20* (2013.01); *H04L 45/46* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 8,675,672 B1 | 3/2014 | Bao et al. | |
| 8,861,527 B1* | 10/2014 | Bao | H04L 12/1836 370/392 |
| 9,590,887 B2* | 3/2017 | Mahadevan | H04L 45/026 |
| 2004/0249972 A1* | 12/2004 | White | H04L 67/104 709/243 |

(Continued)

OTHER PUBLICATIONS

Office Action dated May 22, 2017, 31 pages, U.S. Appl. No. 14/880,780, filed Oct. 12, 2015.

(Continued)

*Primary Examiner* — Sithu Ko
(74) *Attorney, Agent, or Firm* — Conley Rose, P.C.

(57) ABSTRACT

A method implemented in a network element (NE) configured to operate in an information centric network (ICN), the method comprises creating, by a processor of the NE, a minimum spanning tree for an overlay cluster to which the NE is assigned within a host domain, wherein the minimum spanning tree comprises a root corresponding to the NE and a plurality of member nodes assigned to the overlay cluster, and broadcasting, by a transmitter coupled to the processor, a hash cluster setup (HCS) message to the member nodes, wherein the HCS message comprises source path routing information for the overlay cluster and hop limit values corresponding to distances within the ICN between the NE and each of the member nodes.

17 Claims, 7 Drawing Sheets

(56) References Cited

U.S. PATENT DOCUMENTS

| | | | |
|---|---|---|---|
| 2011/0205949 A1* | 8/2011 | Maenpaa | H04W 40/005 |
| | | | 370/311 |
| 2013/0060962 A1 | 3/2013 | Wang et al. | |
| 2014/0079067 A1 | 3/2014 | Jeon et al. | |
| 2014/0173076 A1 | 6/2014 | Ravindran et al. | |
| 2014/0192717 A1* | 7/2014 | Liu | H04W 60/00 |
| | | | 370/328 |
| 2015/0163127 A1* | 6/2015 | Garcia-Luna-Aceves | |
| | | | H04L 43/10 |
| | | | 709/242 |
| 2015/0319084 A1 | 11/2015 | Hui et al. | |
| 2016/0197831 A1* | 7/2016 | De Foy | H04L 45/7453 |
| | | | 370/392 |
| 2017/0026282 A1* | 1/2017 | Huang | H04L 45/122 |

OTHER PUBLICATIONS

Notice of Allowance dated Nov. 14, 2017, 11 pages, U.S. Appl. No. 14/880,780 filed Oct. 12, 2015.

* cited by examiner

HASH-BASED OVERLAY ROUTING ARCHITECTURE FOR INFORMATION CENTRIC NETWORKS

CROSS-REFERENCE TO RELATED APPLICATIONS

This patent application is a divisional of co-pending U.S. patent application Ser. No. 14/880,780, filed Oct. 12, 2015, by Aytac Azgin, et al., and entitled, "Hash-Based Overlay Routing Architecture for Information Centric Networks."

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g., forwarding plane) is decoupled from control decisions (e.g., control plane), such as routing, resources and other management functionalities in a centrally-controlled network. The decoupling also allows the forwarding plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

In one embodiment, the disclosure includes a network element (NE) configured to operate in an information centric network (ICN), the NE comprising a receiver configured to receive an Interest packet comprising a requested content name corresponding to a content item stored with the ICN; a processor coupled to the receiver, wherein the processor is configured to determine based on information indicating cached content within a plurality of nodes that comprise a neighborhood whether the content item is stored on a node within the neighborhood, wherein the node that comprises the neighborhood are within a defined hop distance from the NE; when the content item is not stored in the neighborhood, determine an assigned overlay cluster to which the requested content name is assigned, wherein the assigned overlay cluster is determined based on a result of a globally shared hash function applied to the requested content name; and when the content item is not stored in the neighborhood, assign a next node coupled to the assigned overlay cluster as the next hop; and a transmitter coupled to the processor configured to forward the Interest packet to the next hop.

In another embodiment, the disclosure includes a method implemented in a network element (NE) configured to operate in an information centric network (ICN), the method comprising receiving an Interest packet through an interface, wherein the Interest packet comprises a requested content name, wherein the requested content name is assigned to an overlay cluster comprising a plurality of NEs within the ICN; and forwarding, through a transmitter coupled to the interface, the Interest packet to a closest cluster node allocated to the overlay cluster when a content item corresponding to the requested content name is determined to not be cached on any of a plurality of nodes within a neighborhood, wherein the neighborhood comprises the nodes, and wherein the nodes are within a defined hop distance from the NE.

In yet another embodiment, the disclosure includes a method implemented in a network element (NE) configured to operate in an information centric network (ICN), the method comprising creating a minimum spanning tree for an overlay cluster to which the NE is assigned within a host domain, wherein the minimum spanning tree comprises a root corresponding to the NE and a plurality of member nodes assigned to the overlay cluster; and broadcasting a hash cluster setup (HCS) message to the member nodes, wherein the HCS message comprises source path routing information for the overlay cluster and hop limit values corresponding to distances within the ICN between the NE and each of the member nodes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An information centric network (ICN) is a type of network architecture that focuses on information delivery. ICNs may also be known as content-aware, content-centric, or data specific networks. ICNs shift the Internet Protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based, even though the packet forwarding policies can make use of geographical routing schemes. The entities that are distributed or operated on in an ICN communication model are information objects. Some examples of information objects may include content, data streams, services, user entities, and/or devices. In an ICN, information objects are assigned entity-based names (e.g., application-based, host-based, device-based), which are used to address the information objects, decoupling the information objects from locations. Routing to and from the information objects are based on the assigned names. ICN provisions for in-network caching, where a wide variety of network devices or elements serve as temporary content servers.

A content allocation architecture in an ICN provides functions for content-based resource allocation. Within this type of architecture, scheduling policies may take advantage of these functions to achieve a significant gain over IP resource allocation procedures. In such a network, the data-forwarding capability (e.g., the data/forwarding plane) may be decoupled from the routing, resource, and other management functionality (e.g., the control plane). In various embodiments, network elements (NEs) within the ICN may be configured to implement the forwarding/data plane functions, while the control plane functions may be provided by an NE configured as an ICN controller.

The ability of an ICN to efficiently forward packets (e.g., Interest, Data) is a concern in the design of an ICN architecture due to the impact on overall networking performance. In an ICN, forwarding decisions are made based on routing tables that are employed by the ICN controller to establish a Forwarding Information Base (FIB). Each NE configured to function within the forwarding plane employs an FIB, which establishes the forwarding strategy for any received requests (e.g., Interest packets). Because forwarding information is derived from the routing protocols implemented by the NE within the ICN, routing techniques are designed to maximize forwarding efficiency. Further, each NE configured to function within the forwarding plane employs a Pending Interest Table (PIT). Entries in the PIT correspond to Forwarded Interest packets received and then forwarded on an NE. NEs determined as the next hop along a return path of received Data packets are based on the corresponding PIT entries.

Disclosed herein are various mechanisms for a hash-based overlay architecture implemented in a NE configured to be employed within an ICN. The disclosed hash-based overlay architecture allows for the distribution of namespace management, supports overlay forwarding, and enables intelligent caching of content on NEs. As discussed below, an ICN may be divided into multiple domains based on, for example, the hierarchal namespace of content serviced via the ICN. The ICN may employ the disclosed hash-based overlay architecture to establish hierarchical routing tables, content delivery paths, and in-network caches within a domain and/or multiple domains by mapping the ICN into overlay clusters (e.g., hashing groups). The overlay clusters are determined via the employment of a globally shared hash function applied to the namespace(s) managed by the ICN. Once assigned, the overlay clusters are comprised of NEs (e.g., nodes) that manage a portion(s) of the namespace(s). Overlay clusters may be global or local. Global clusters are common to all domains within the ICN, while local clusters are sub-divisions of global clusters and specific to a particular domain. Depending on resource availability and active resource usage, namespace distribution within an overlay cluster may be modified during network runtime to balance the demand on network resources. Limiting namespace availability to within the overlay cluster allows fewer dedicated resources at each NE. In various embodiments, hash functions (e.g., global and local hash functions) are employed by the NEs within the ICN to determine whether an NE is responsible for managing the namespace of the content name within a received packet (e.g., whether the NE is assigned to the overlay cluster corresponding to the requested content). NEs within an overlay cluster are configured to determine forwarding decisions and cache content for packets comprising a namespace assigned to the overlay cluster. NEs are further configured to make limited forwarding decisions within a local neighborhood (e.g., m-hop locality, where m represents a determined number of nodes away from the reference node) for packets received comprising namespaces managed by other overlay clusters. The disclosed hash-based overlay architecture reduces setup, enables faster access to content through, and distributes network resources (e.g., forwarding and caching) more efficiently by, for example, providing alternate paths to requested content and limiting caching to within an overlay cluster.

Figure 1:
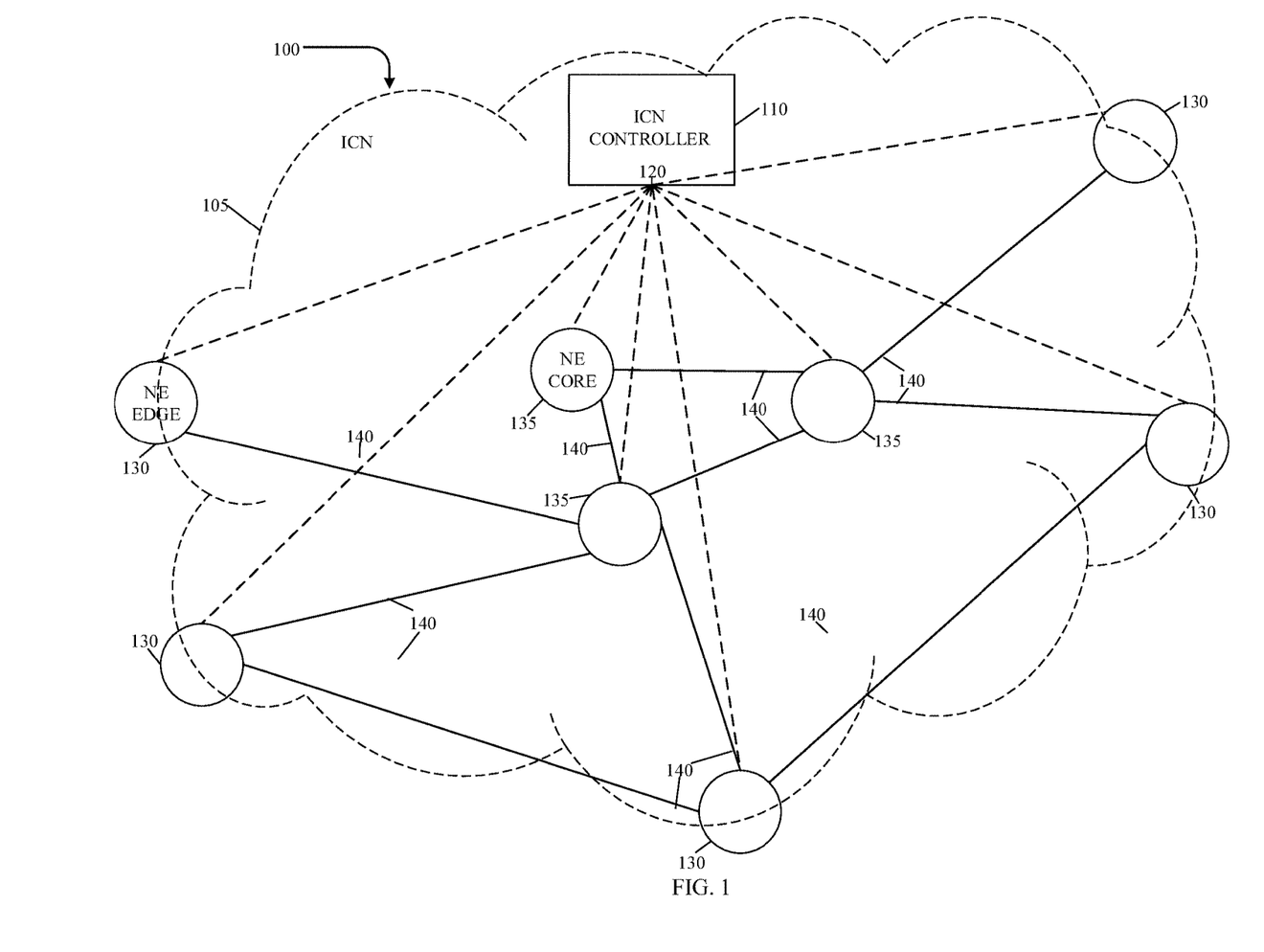
FIG. 1 is a schematic diagram of an embodiment of an architecture of an ICN.

FIG. 1 is a schematic diagram of an embodiment of an architecture 100 of an ICN 105. The ICN 105 comprises an NE acting as an ICN controller 110 (e.g, domain controller) and a plurality of NEs acting as core content nodes 135, a plurality of edge content nodes 130, and/or other NEs, such as content producers and/or content consumers. As used herein, both edge content nodes 130 and core content nodes 135 may be referred to as content nodes. The edge content nodes 130 may be connected to at least one node outside of the ICN 105 and may provide security, translations, and other services for network traffic entering or leaving the ICN 105. The core content nodes 135 may not be connected to any node outside of the ICN 105. The content nodes 130 and 135 are interconnected by a plurality of links 140 and connected to the ICN controller 110 through network control interfaces 120.

The ICN 105 provides in-network caching, built-in content security, and multi-cast data distributions according to the hash-based overlay architecture protocol. The ICN 105 may comprise one or more networking domains that are operated by one or more administrative domains. The links 140 may comprise physical links, such as fiber optic links, electrical links, wireless links, and/or logical links used to transport data in the ICN 105.

NEs 130 and 135 may be any physical devices, such as routers and/or network switches, or logical devices configured to perform switching functions in the ICN 105 as directed by the ICN controller 110. The switching functions include measuring statistics, monitoring context changes, and forwarding incoming Interest packets based on the applied hash-based overlay architecture via the application of forwarding rules to the incoming packets.

The ICN controller 110 may be a device, a virtual machine (VM), a hypervisor, or any other device operating in the control plane and configured to manage and/or control the routing and other management functions for NEs 130 within the ICN 105. The ICN controller 110 may be any type of network controller, such as a centralized controller or a distributed controller. In an embodiment, the ICN controller 110 is a software-defined networking (SDN) controller, such as an OpenFlow-enabled controller. In such an embodiment, the forwarding plane is decoupled from the control plane, and the ICN controller 110 configures each of the content nodes 130 and 135 with forwarding rules in the form of, for example, routing tables and/or flow tables. At least a portion of the forwarding plane may be included in the ICN, wherein the ICN includes multiple paths between a source and a destination. Some ICN architectures such as Content Centric Networking (CCN)/Named Data Networking (NDN) do not specify a controller, and assume a distributed routing mechanism. However, CCN/NDN includes a strategy layer that selects forwarding mechanisms for the network. For example, if an upstream edge content node has some knowledge of the downstream network congestion, the upstream edge content node may select the proper path for the data messages by assuming the function of the (now distributed) controller. For simplicity, the description is presented with respect to a centralized ICN controller. The presented approaches can be readily implemented with other controllers.

The ICN controller 110 may be physically or logically located within the ICN 105. In an embodiment, the ICN controller 110 may be a centralized logical entity distributed across one or more NEs. In another embodiment, the ICN controller 110 may be implemented as a network control module within a VM. It should be noted the ICN controller 110 may be coupled to any of the NEs 130 and/or 135 in the ICN 105.

The ICN controller 110 performs a variety of network control functions according to the application-specific objectives. Some examples of network control functions may include, but are not limited to, generating and maintaining network topologies, identifying application flows, determining routes through the ICN 105, establishing producer namespaces, and managing network resources and network state information. The ICN controller 110 may not perform data plane functions, such as forwarding data traffic to a selected destination. Moreover, the ICN controller 110 may be able to produce, based on defined routing tables, forwarding rules that define how incoming packets are routed within the ICN 105. In one embodiment, the ICN controller 110 may be integrated within a network operating system.

ICN Controller 110 manages information flow within the ICN 105 among the different domains. In various embodiments, the ICN controller 110 divides the ICN 105 into global overlay clusters (e.g., hashing groups). Each global overlay cluster comprises NEs (e.g., nodes) among the various domains within the ICN 105 and manages a portion of the namespace governed within the ICN 105. Global clusters are common to all domains within the ICN. A global hashing function is determined and persists globally throughout the ICN 105. Assignment of a namespace to a global overlay cluster is determined based on the hash function.

As part of the control plane functionality, the ICN controller 110 may be configured to collect fine-grained network information from content nodes 130 and 135 through the network control interface 120. Fine-grained network information may pertain to any of the information within the ICN 105, which may include, but are not limited to, the ICN domain topology, link capacity within the ICN 105, available bandwidth on each link with the ICN 105, and status of links that belong to the ICN 105 but are connected to the content nodes 130 and/or 135 and/or network nodes external to the ICN 105. Additionally, the fine-grained network information may be application-specific statistics, such as content popularity, or provider-specific, such as content provider popularity. Content popularity refers to the number of requests for a particular content item received from content consumers. Content provider popularity refers to the number of content consumers that download content via a particular content provider.

To deliver content through the forwarding plane of ICN 105, the ICN controller 110 may generate forwarding rules by employing source-based overlay trees. In various embodiments, source based overlay trees map the distribution of namespace availability within domain and among different domains within ICN 105. In one example, a namespace within a domain may be published by a content producer as content within the namespace becomes available for consumption. The ICN controller 110 receives the published namespace and determines, based on a determined hash value, an overlay path for the namespace.

The ICN controller 110 selects one of the NEs within each overlay cluster (overlay nodes) to serve as a Head Controller (HC) for the overlay cluster. The ICN controller 110 distributes forwarding rules to HC for each overlay cluster which then distributes the forwarding rules to overlay nodes within its overlay cluster. In various embodiments, the HC employs a source-based overlay tree that comprises the HC as the starting point. The HC may forward updates according to the source-based overlay tree. In a similar way, aggregated forwarding rules may be distributed to multiple domains (e.g., via the employment of a source-based overlay tree). In these embodiments, the source-based overlay tree may have the ICN controller 110 as the root or use each of the HCs as the root for the delivery of its updates, and the aggregated information is delivered to the other domains based on the source-based overlay tree. In this manner, two different types of source-based overlay trees may be employed: 1) among the domains within an ICN and 2) within a particular domain within an ICN.

The network control interfaces 120 support communications between the ICN controller 110 and the NEs 130 and 135 and may employ a communication protocol and/or extend a communication protocol, such as the OpenFlow protocol. The NEs 130 and 135 receive routing decisions based on forwarding rules and the source-based overlay trees from the ICN controller 110. For example, the content nodes 130 and 135 create/update entries in the FIB or forwarding labels stored in a Forwarding Label Table (FLT) based on the received routing decisions. FIB entries store content name prefixes and corresponding downstream (e.g., outbound) interfaces coupled to a next hop within the ICN 105 toward a corresponding content producer. Forwarding labels are related to NE connectivity.

To obtain a particular content item, a content consumer (e.g., content requester) creates an Interest packet comprising the content name. The content consumer sends the Interest packet through the ICN 105. The Interest packet is received by edge NE 130 and routed through the ICN 105 by the content nodes 130 and 135 toward the source of the requested content item. Routing through the ICN is based on the determined hash overlay cluster. In one embodiment, the hash overlay cluster is determined based on a hashed value of the content name prefix. When the Interest packet reaches a node within the ICN 105 that contains (e.g., has cached) the requested content item, a Data packet(s) comprising the content item is constructed. The Data packet is returned to the content consumer through the ICN 105 along the path traveled by the corresponding Interest packet. Each NE along the return path receives the Data packet and determines whether it is assigned to the overlay cluster corresponding to the hashed content name prefix contained within the Data packet. Such NEs along the return path may cache the content item in memory. In various embodiments, NEs 130 and 135 measure fine-grained network information as packets arrive at the content nodes 130 and 135. The NEs 130 and 135 provide the fine-grained network information to the ICN controller 110 through the network control interface 120.

Figure 2:
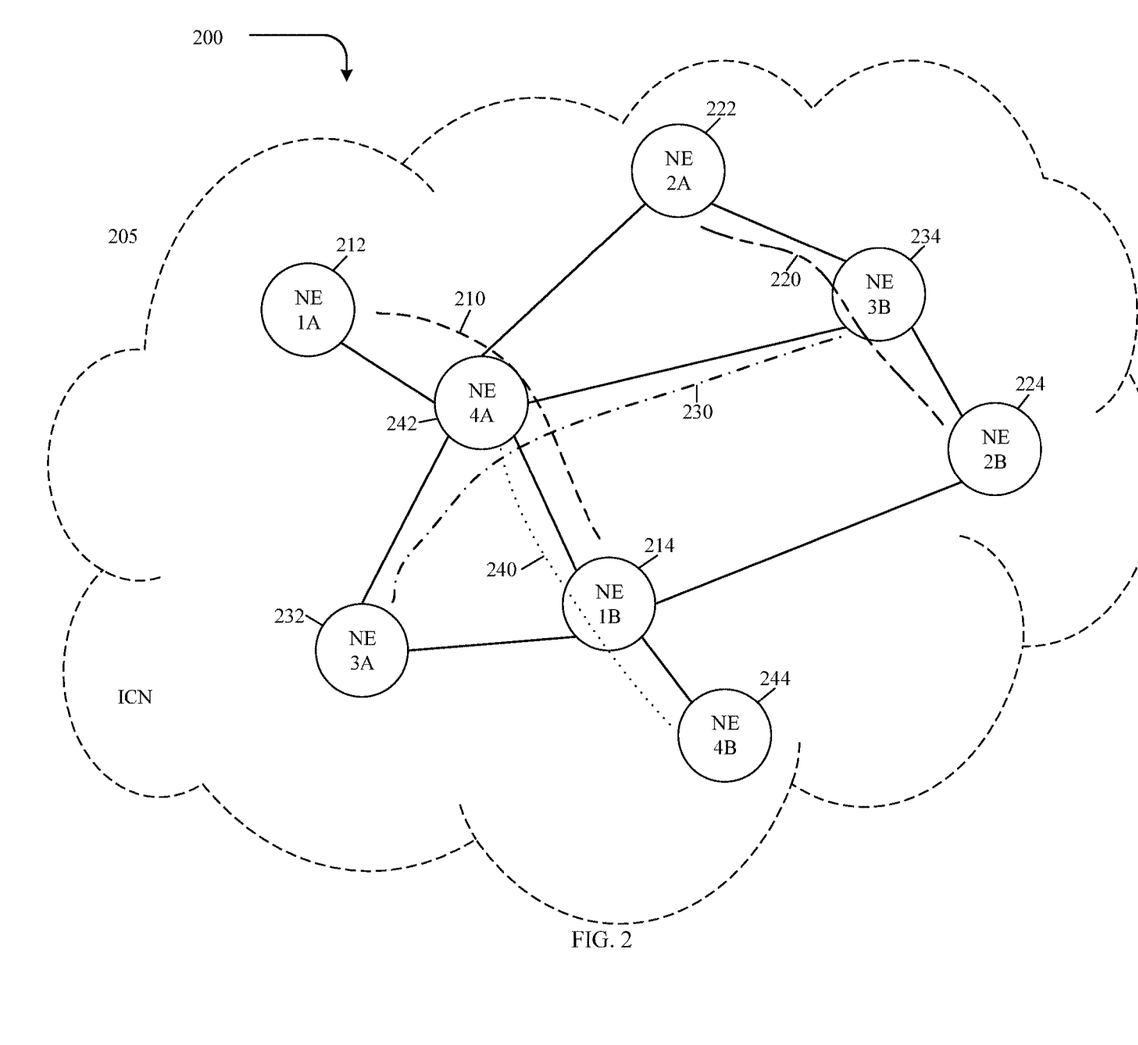
FIG. 2 is a schematic diagram of an embodiment of an overlay architecture that depicts overlay clusters within a single domain of an ICN.

FIG. 2 is a schematic diagram of an embodiment of an overlay architecture 200 that depicts overlay clusters (e.g., hash groups) 210, 220, 230, and 240 within a single domain of an ICN 205. ICN 205 is substantially similar to ICN 105 of FIG. 1. ICN 205 comprises four distinct overlay paths (e.g., hash groups) 210, 220, 230, and 240 each comprising two NEs (212, 214, 222, 224, 232, 234, 242, and 244). The disclosed embodiment depicts four overlay clusters comprising two NEs for illustrative purposes. A domain may comprise more or less overlay clusters and an overlay cluster may comprise more or less than two NEs. NE's 212, 214, 222, 224, 232, 234, 242 and 244 are substantially similar to NEs 130 and 135 of FIG. 1.

Within ICN 205, packet forwarding occurs along the overlay paths. An overlay path is determined for an incoming request for content (e.g., Interest packet) to the ICN based on the matching hash cluster of the requested content namespace. To build the routing tables and establish network connectivity within ICN 205, two sets of operations, node connectivity and content connectivity, are employed. Node connectivity ensures reachability to all the nodes in the network and content connectivity ensures reachability to all the content shared or stored within the network. In the disclosed embodiment, all nodes 212, 214, 222, 224, 232, 234, 242, and 244 within the ICN 205 have a clear view of a network topology. The network topology is derived through a default routing approach, such as for example, link state routing or distance vector routing. In one embodiment, a distance-vector routing based approach allows all nodes within the ICN 205 to discover "neighbors" (e.g., nearby nodes and/or next hop) and reachability to every other node in the network. In one embodiment, the vector based routing approach may be restricted, meaning that all the nodes must discover the reachability of nodes within an assigned domain. Content connectivity, on the other hand, is achieved by employing a hierarchical controller-based approach.

In various embodiments, node assignments to the overlay cluster within a domain (e.g., local overlay cluster) are independently managed within the domain based on local constraints. NEs within an overlay group are referred to as member nodes. An HC (e.g., a Domain Name Controller) is determined for each local overlay cluster. In an embodiment, the HC node is determined based on a minimum mean distance (e.g., hop count) to the various nodes within the assigned overlay cluster. Additional criteria may also be employed to avoid bottlenecks and balance the communication load. An HC node is a node selected to manage the grouping of hash overlay nodes and may be configured to reassign nodes from one overlay cluster to another to maximize the communication efficiency. In various embodiments, the node assignments to hash clusters ensure even load distribution in the network. In an embodiment, the number of local overlay clusters may be larger than the number of global overlay clusters as the local overlay clusters may be created through local partitioning of the global overlay clusters, thus ensuring that the mapping consistency is preserved.

In various embodiments, each HC creates a minimum spanning tree (spanning tree) for the managed overlay cluster. Each spanning tree is rooted at the corresponding HC to ensure loop free communication for the overlay cluster. Each HC may broadcast a hash cluster setup (HCS) message within the domain. Using information on the hop limit values (which represents the closeness to the HC nodes) each node within a local overlay cluster can determine how to reach the HC node based on the HCS message. In one embodiment, the larger a hop limit is within the HCS message, the closer a node is to the HC. Nodes within a local overlay cluster rebroadcast the HCS message. Each node may employ the HCS message content to support the use of source path routing from the leaves to the HC along the minimum spanning tree. Additionally, an HC identifier, which is assigned to each HC, may associate the assigned HC directly with the host domain to which the HC is assigned.

In various embodiments within the ICN 205, inter-domain interactions are distributed among the HCs of the different domains. These HCs interact with one another along source-based trees rooted at each HC node independently. Thus, each HC node may employ the corresponding source-based tree to deliver updates related to its assigned domain. In an embodiment, inter-domain updates are made at specific time intervals in batch mode. In another embodiment, inter-domain updates are made instantaneously in single update delivery mode.

In one embodiment, information exchange is enabled between HCs through exchanging the published namespaces for each overlay cluster in update messages sent over the pre-constructed overlay paths. Update messages carry information on the newly inserted or removed namespaces together with the domain, HC, and hash group identifiers.

In an alternative embodiment, information exchange is enabled between HC through the employment of optimized Counting Bloom Filter. In this embodiment, the available namespace for each hash group is divided into multiple hierarchically structured subgroups which enable HCs within different domains representing the same hash groups to create a different number of subgroups to be used for their announcements.

In various embodiments, a producer is a node that produces content. A producer namespace (e.g., the namespace of serviced content) is established by the HC. The producer namespace is maintained within the producer's domain, within the assigned overlay cluster, and within the local neighborhood of the producer rather than via a centralized content directory (not shown) for the entire ICN 205. In an embodiment, content distributed through a producer and assigned to an overlay cluster is stored on the NEs that comprise the overlay cluster. An NE may store a received content item (e.g., receiver via a Data packet) based on whether an NE has the resources to store the content (e.g., opportunistically).

A content source directory is an NE that acts as a long term storage node for content from a producer. In an embodiment, by default a content source directory for a producer is determined based on a nearest matching node within the overlay cluster mapped to the producer namespace with enough resources to handle the additional namespace. The content source directory may be changed to another node within the overlay cluster for the producer namespace depending on storage requirements and/or availability at the initially assigned NE. In an embodiment, other NEs within the overlay cluster not including the producer or the content source directory, act as temporary caches for content distributed from the producer.

In various embodiments, when a producer publishes new content, the NE that is interfacing the producer on the hash overlay network communicates the update to the HC managing the overlay cluster mapped to the content (e.g., the producer) namespace. Additionally, the member nodes along the path toward the HC node keep a record of the received update. When the HC receives the update, the HC forwards the update to the remaining nodes within the overlay cluster along and according to the minimum spanning tree. In an embodiment, NEs that have already received the update may be skipped. In an embodiment, the update message comprises various fields. In one example the fields comprise a content name that identifies the published namespace, a Publisher Identifier (Pid) that identifies the content origin and a Service Point Identifier (SPid) that identifies the node that manages the namespace for the listed publisher and acts as the potential repository for the publisher, if supported.

Through an exchange of these update messages, each member node has direct access to information in regards to the management of namespaces within the assigned domain, for example information indicating how each member may reach a namespace. By establishing source distribution trees rooted at member nodes within each domain, member nodes can forward Interest packets that correspond to a local namespace to the NE managing that namespace within a local neighborhood. In turn, the NE managing the namespace (e.g., the NE within the local neighborhood) may either respond with a Data packet if the content is locally stored, or forward the request to the publisher.

Figure 3:
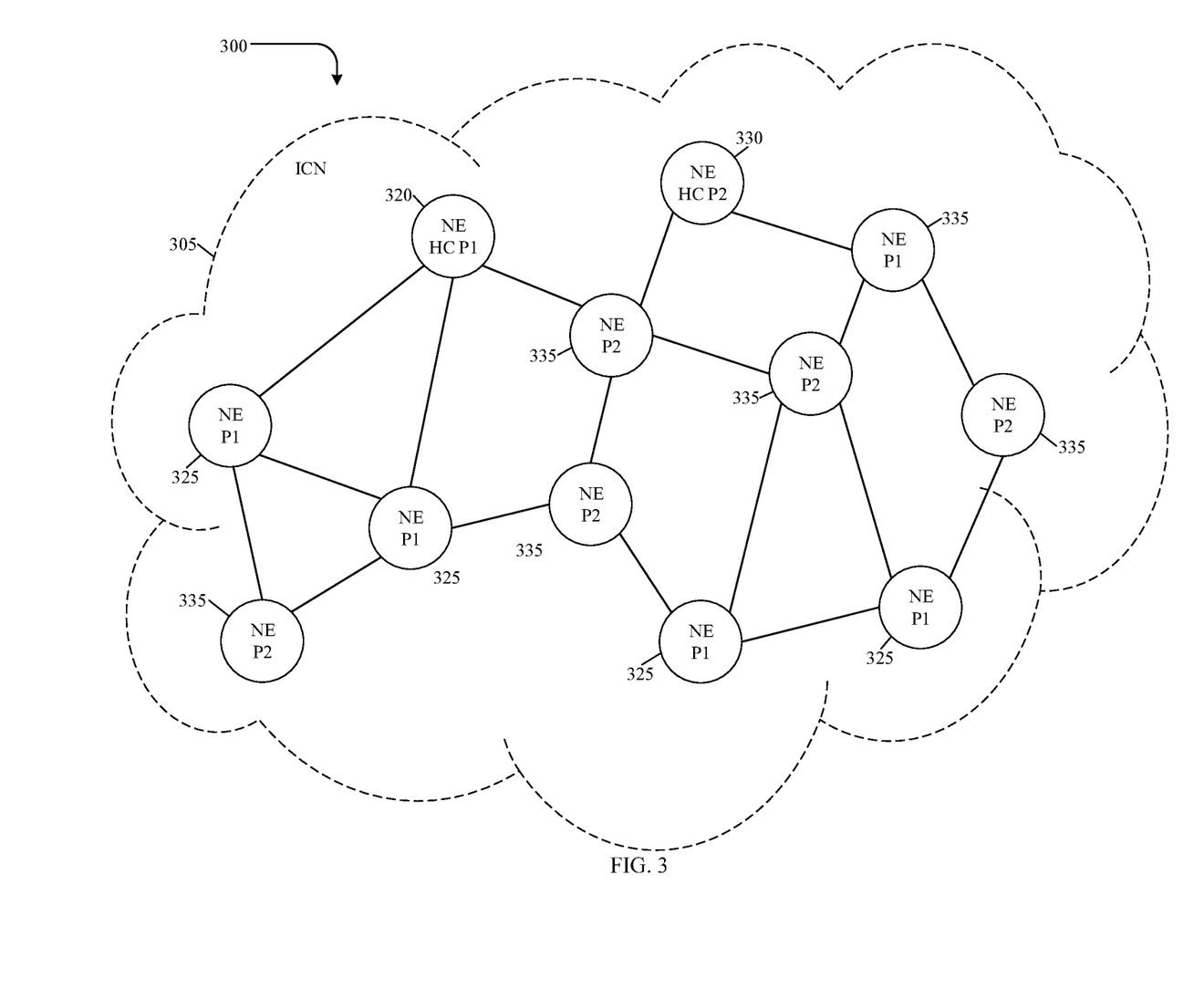
FIG. 3 is a schematic diagram of an embodiment of an overlay architecture that depicts two overlay clusters within a single domain of an ICN.

FIG. 3 is a schematic diagram of an embodiment of an overlay architecture 300 that depicts two overlay clusters P1 and P2 within a single domain of an ICN 305. ICN 305 is substantially similar to ICNs 105 of FIG. 1 and/or ICN 205 of FIG. 2. ICN 305 comprises NEs 320, 325, 330, and 335. NEs 320 and 325 are assigned by an ICN controller, such as ICN controller 110 of FIG. 1, to overlay cluster P1. NEs 330 and 335 are assigned by the ICN controller to overlay cluster P2. The disclosed embodiment depicts two overlay clusters for illustrative purposes. A domain within the disclosed overlay architecture may comprise more or less overlay clusters. NE's 320, 325, 330, and 335 are substantially similar to NEs 130 and 135 of FIG. 1 and NE's 212, 214, 222, 224, 232, 234, 242 and 244 of FIG. 2.

In an embodiment, HC NEs 320 and 330 are selected as HCs for their respectively assigned overlay cluster based on a minimum mean distance (e.g., number of hops) to the various NEs within the assigned overlay cluster. Additional criteria may also be employed to assign the HCs in order to avoid bottlenecks and balance the communication load. In various embodiments, NEs 320 and 330 are responsible for managing the group updates for their assigned overlay cluster. Group updates may include content/route updates to maximize communication efficiency within the ICN 305. In an embodiment, NEs 320 and 330 each function as the HC for their respective overlay cluster by managing a single namespace (e.g., hash group).

Figure 4:
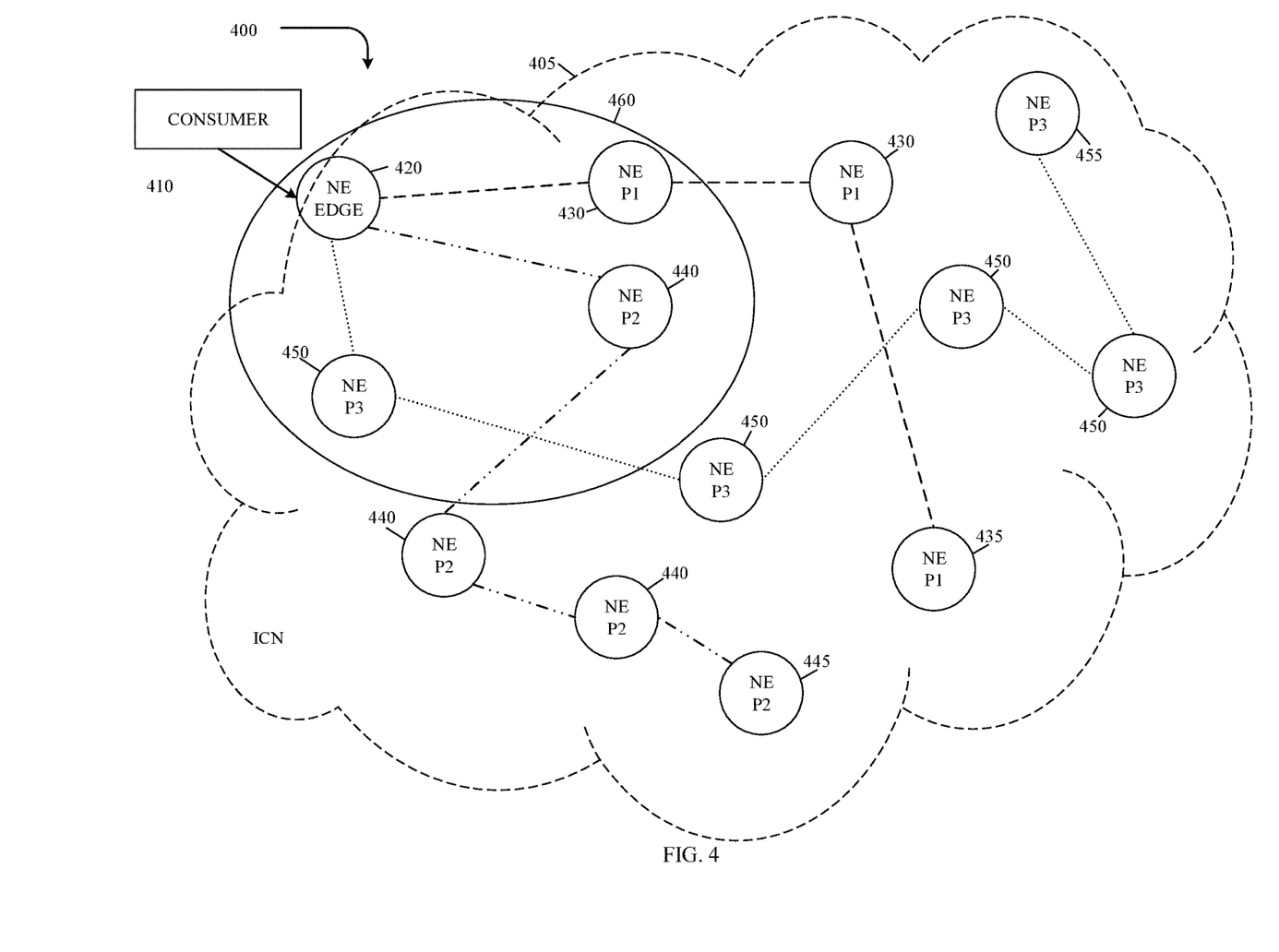
FIG. 4 is a schematic diagram of an embodiment of an overlay architecture that depicts three overlay clusters within a single domain of an ICN 405.

FIG. 4 is a schematic diagram of an embodiment of an overlay architecture 400 that depicts three overlay clusters P1, P2, and P3 within a single domain of an ICN 405. ICN 405 is substantially similar to ICNs 105 of FIG. 1, ICN 205 of FIG. 2, and/or ICN 305 of FIG. 3. ICN 405 comprises NEs 420, 430, 435, 440, 445, 450 and 455. Edge NE 420 is substantially similar to edge NE 130 of FIG. 1. NEs 430, 435, 440, 445, 450 and 455 are substantially similar to Core NEs 135 of FIG. 1. NEs 430 and 435 are assigned by an ICN controller, such as ICN controller 110, to overlay cluster P1. NEs 440 and 445 are assigned by the ICN controller to overlay cluster P2. NEs 450 and 455 are assigned by the ICN controller to overlay cluster P3. The disclosed embodiment depicts three overlay clusters for illustrative purposes. A domain within the disclosed overlay architecture may comprise more or less overlay clusters. In an embodiment, NEs 435, 445, and 455 are employed within their respective overlay cluster as a content source directory. In another embodiment, NEs 435, 445, and 455 are employed within their respective overlay cluster as producers.

In an embodiment, consumer 410 sends a request for content to the ICN 405. Edge NE 420 receives the requests. Edge node 420 determines if the requested content may be stored at an NE within m-hop distance neighborhood 460. In one embodiment, the content is determined to be stored within m-hop distance neighborhood 460 based on a bloom filter. If the content is found, NE 420 forwards the request to the NE within the m-hop distance neighborhood 460 that has cached the requested content. If the content is not found within the m-hop distance neighborhood 460, NE 420 applies a globally shared hash function to the routable name of the request prefix of the requested content name. Edge NE 420 determines the assigned overlay cluster based on the resulting hash and determines the next hop within the overlay cluster. The edge NE 420 forwards the request to the determined next hop. Each NE along the path within the overlay cluster then forwards the requests on the determined overlay hash forwarding path toward the requested content.

In various embodiments, an NE, such as NE 420, 430, 435, 440, 445, 450 and 455, may be assigned to one and only one overlay cluster group. In other embodiments, an NE, such as NE 420, 430, 435, 440, 445, 450 and 455 may be assigned to multiple hash groups.

Figure 5:
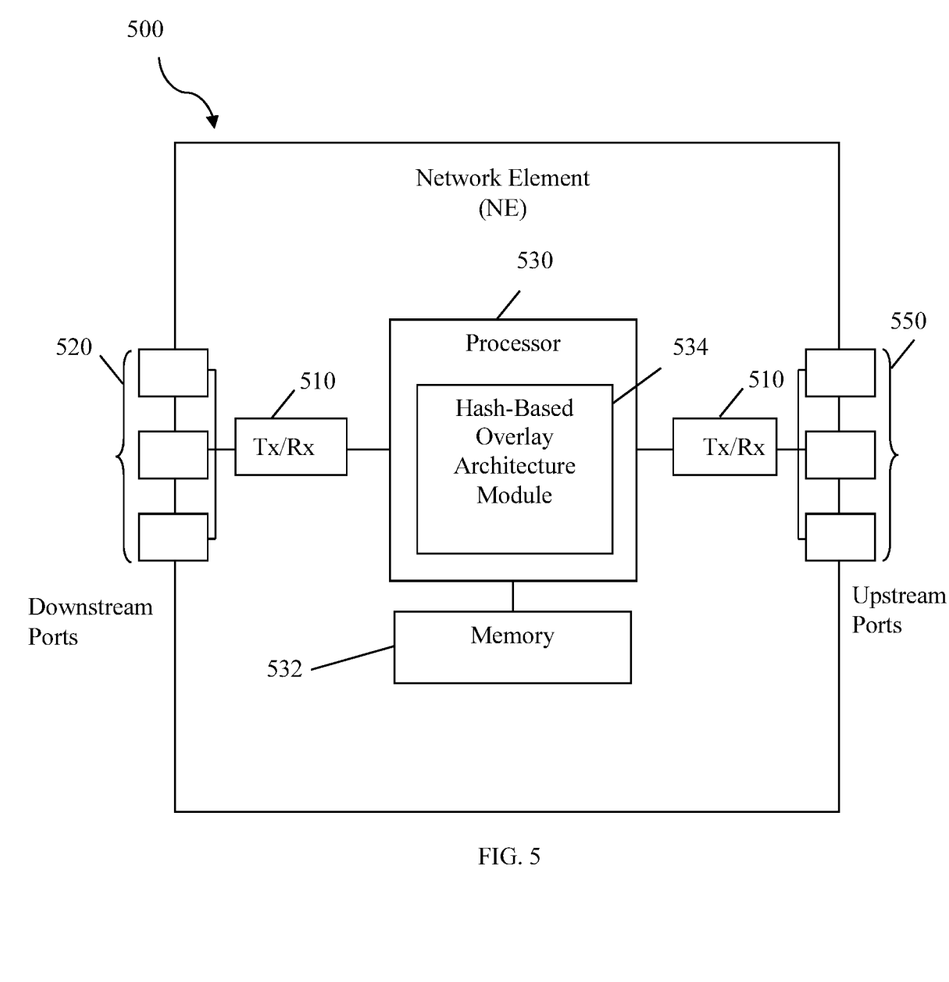
FIG. 5 is a schematic diagram of an embodiment of an NE within an ICN.

FIG. 5 is a schematic diagram of an embodiment of an NE 500 within an ICN, such as ICN 105 of FIG. 1, ICN 205 of FIG. 2, ICN 305 of FIG. 3, and/or ICN 405 of FIG. 4. NE 500 may be any component configured to act as an ICN controller, such as ICN controller 110 and/or content nodes, such as NEs 130 and 135 of FIG. 1, NE's 212, 214, 222, 224, 232, 234, 242 and 244 of FIG. 2, NE's 320, 325, 330, and 335 of FIG. 3, and NEs 420. 430, 435, 440, 445, 450 and 455 of FIG. 4. NE 500 may be implemented in a single node or the functionality of NE 500 may be implemented in a plurality of nodes. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 500. For instance, the features/methods in the disclosure may be implemented using hardware, firmware, and/or software installed to run on hardware. The NE 500 is any device that transports packets through a network, e.g., a switch, router, bridge, server, a client, etc.

As shown in FIG. 5, the NE 500 may comprise transceivers (Tx/Rx) 510, which are transmitters, receivers, or combinations thereof. A Tx/Rx 510 is coupled to a plurality of downstream ports 520 (e.g., downstream interfaces) for transmitting and/or receiving packets from other nodes and a Tx/Rx 510 coupled to a plurality of upstream ports 550 (e.g., upstream interfaces) for transmitting and/or receiving packets from other nodes, respectively. A processor 530 is coupled to the Tx/Rxs 510 to process the packets and/or determine which nodes to send packets to. The processor 530 may comprise one or more multi-core processors and/or memory 532 devices, which function as data stores, buffers, Random Access Memory (RAM), Read Only Memory (ROM), etc. Processor 530 may be implemented as a general processor or may be part of one or more application specific integrated circuits (ASICs) and/or digital signal processors (DSPs). Processor 530 comprises a Hash-Based Overlay Architecture Module 534, which implements at least some of the methods discussed herein such as methods 600 and 700 described below. In an alternative embodiment, Hash-Based Overlay Architecture Module 534 is implemented as instructions stored in memory 532, which are executed by processor 530, or implemented in part in the processor 530 and in part in the memory 532, for example a computer program product stored in a non-transitory memory that comprises instructions that are implemented by the processor 530. In another alternative embodiment, the Hash-Based Overlay Architecture Module 534 is implemented on separate NEs. The downstream ports 520 and/or upstream ports 550 may contain electrical and/or optical transmitting and/or receiving components.

It is understood that by programming and/or loading executable instructions onto the NE 500, at least one of the processor 530, Hash-Based Overlay Architecture Module 534, Tx/Rxs 510, memory 532, downstream ports 520, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment, NE 500 is assigned to an overlay cluster. NE 500 may create an ordered node-distance list for each node within its neighborhood, such as m-hop distance neighborhood 460 of FIG. 4. In an embodiment, entries in the ordered node-distance list comprise a node identifier, a hash cluster identifier, and a next-node associated with a distance. In another embodiment, NE 500 may create a bloom filter map comprising the NEs within its neighborhood. In various embodiments, NE 500 determines how to reach at least one node within the other global overlay clusters (e.g., the overlay to which the NE is not assigned). NE 500 may store an overlay member list comprising entries for members (e.g., NEs) assigned to same overlay cluster to which the NE is assigned. Entries in the member list may comprise a node identifier, a nest node associated with a distance, and a content listing. In an embodiment after node connectivity is established, the member list is shared along overlay trees for the overlay cluster to which the NE is assigned. In an embodiment, the Hash-Based Overlay Architecture Module 534 is configured to function as an HC.

In various embodiments, Hash-Based Overlay Architecture Module 534 is configured to employ a two-tier approach to finding content when a request is received. The first step is to search the local m-hop neighborhood for the content. If content is determined to be stored in the local m-hop neighborhood (stored locally), the Hash-Based Overlay Architecture Module 534 may send the request directly to the determined NE. If the content is not stored locally, the Hash-Based Overlay Architecture Module 534 sends the request to the closest node assigned to the hash overlay mapped to the namespace contained in the content request.

In an embodiment, a bloom filter based database may be employed by NE 500 to determine a possible match for requested content within a local m-hop neighborhood. When a possible match is found, the NE may send the request to the matched NE. Additionally, if multiple matches are found, the NE sends the request to the closest of the matched NEs. In the case of false positives (i.e, match by Bloom filter but with no matching content), requests may be handled in various ways. For example, through forwarding the request to a subset or all the matching neighbors at a given step (for instance, using a limited or scoped broadcast within the m-hop neighborhood) or acting with the assumption of no match in the m-hop neighborhood.

In an embodiment, NE 500 may employ a forwarding label to forward the request to the content source(s). Hash-Based Overlay Architecture Module 534 may determine that a node within the m-hop neighborhood has cached the requested content. NE 500 may then employ a forwarding label to directly send the request to the determined NE. The use of the forwarding label allows the NE 500 to reach the determined NE directly through the designated node in the m-hop neighborhood thus bypassing the forwarding operation.

In various embodiments, NE 500 may receive a Data packet comprising a content item. Hash-Based Overlay Architecture Module 534 determines whether the content is mapped to the overlay cluster to which the NE 500 is assigned. If the content is mapped to the assigned overlay cluster, NE 500 may cache the content if the NE has the necessary resources available. NE 500 then forwards the Data to the next node along the return path (whether the content was cached or not). In one embodiment, the next node is determined through the employment of a PIT.

Figure 6:
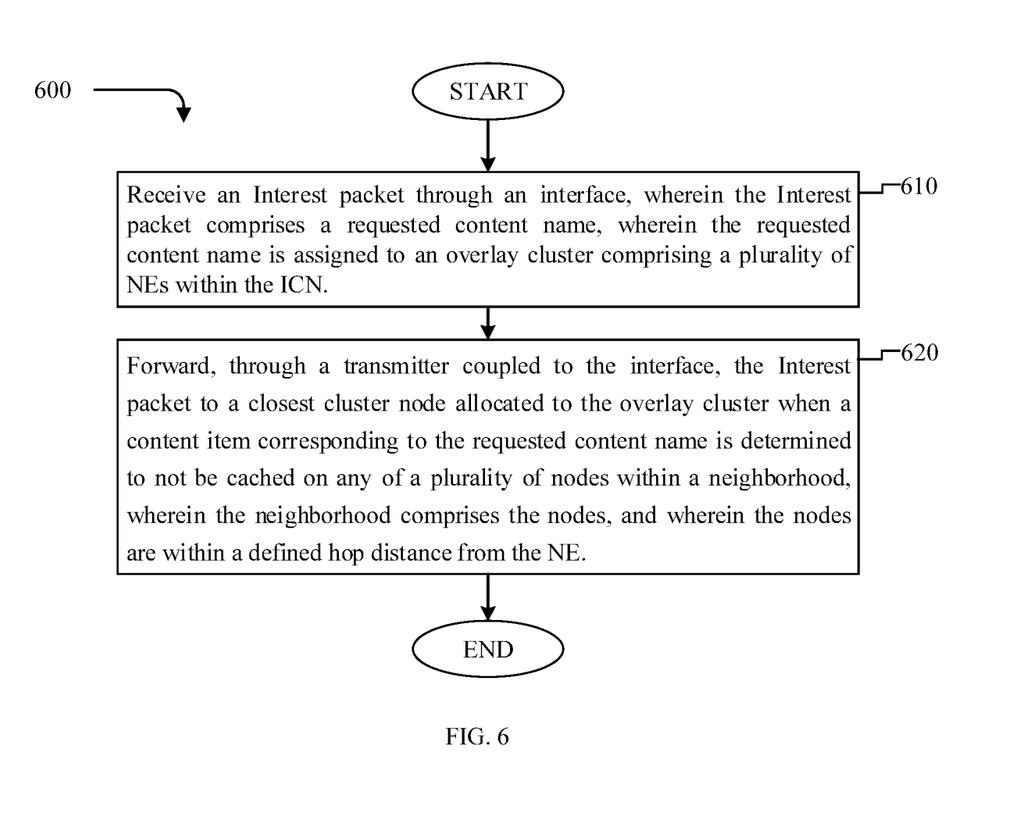
FIG. 6 is a flowchart of an exemplary embodiment employed by an NE in an ICN to receive and forward an Interest packet.

FIG. 6 is a flowchart of an exemplary embodiment employed by an NE, such as NE 500 of FIG. 5, in an ICN, such as ICN 105 of FIG. 1, ICN 205 of FIG. 2, ICN 305 of FIG. 3, and/or ICN 405 of FIG. 4, to receive and forward an Interest packet when the NE receives an Interest packet. At step 610, the NE an Interest packet through an interface, wherein the Interest packet comprises a requested content name, wherein the requested content name is assigned to an overlay cluster comprising a plurality of NEs within the ICN. At step 620, the NE forwards, through a transmitter coupled to the interface, the Interest packet to a closest cluster node allocated to the overlay cluster when a content item corresponding to the requested content name is determined to not be cached on any of a plurality of nodes within a neighborhood, wherein the neighborhood comprises the nodes, and wherein the nodes are within a defined hop distance from the NE.

Figure 7:
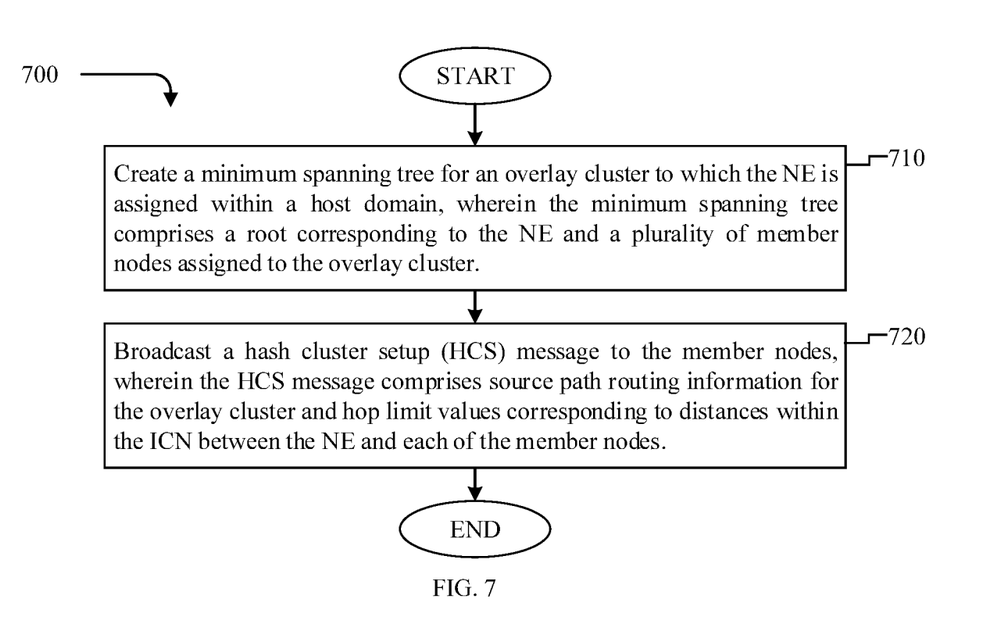
FIG. 7 is a flowchart of an exemplary embodiment employed by an NE in an ICN to create and broadcast a minimum spanning tree for an assigned overlay cluster.

FIG. 7 is a flowchart of an exemplary embodiment employed by an NE, such as NE 500 of FIG. 5, in an ICN, such as ICN 105 of FIG. 1, ICN 205 of FIG. 2, ICN 305 of FIG. 3, and/or ICN 405 of FIG. 4, to create and broadcast a minimum spanning tree for an assigned overlay cluster when the NE has been selected by an ICN Controller, such as ICN Controller 110, to serve as the HC for an assigned overlay cluster. At step 710, the NE creates a minimum spanning tree for an overlay cluster to which the NE is assigned within a host domain, wherein the minimum spanning tree comprises a root corresponding to the NE and a plurality of member nodes assigned to the overlay cluster. At step 720, the NE a hash cluster setup (HCS) message to the member nodes, wherein the HCS message comprises source path routing information for the overlay cluster and hop limit values corresponding to distances within the ICN between the NE and each of the member nodes.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a network element (NE) configured to operate in an information centric network (ICN), the method comprising:
   creating, by a processor of the NE, a minimum spanning tree for an overlay cluster to which the NE is assigned within a host domain, the minimum spanning tree being a data structure indicating a path by which data is transferred within the overlay cluster, and the minimum spanning tree comprising a root corresponding to the NE and a plurality of member nodes assigned to the overlay cluster;
   broadcasting, by a transmitter coupled to the processor, a hash cluster setup (HCS) message to the member nodes based on the minimum spanning tree, the HCS message comprising source path routing information for the overlay cluster and hop limit values corresponding to distances within the ICN between the NE and each of the member nodes; and
   distributing, via pre-constructed overlay paths, an update message to a plurality of Head Controllers (HCs) assigned to other host domains, wherein the update message comprises published namespaces for the overlay cluster.

2. The method of claim 1, further comprising assigning one of the member nodes to another overlay cluster based on an efficiency of communication between the members nodes and other NEs with the host domain.

3. The method of claim 1, further comprising partitioning the overlay cluster into a local overlay cluster, wherein the overlay cluster is a global overlay cluster.

4. The method of claim 1, further comprising receiving, via the pre-constructed overlay paths, published namespaces for overlay clusters within the other host domains for the HCs assigned to the other host domains.

5. The method of claim 1, wherein distributing the update message is performed at a time interval.

6. The method of claim 1, wherein the published namespaces are distributed in a plurality of batches.

7. The method of claim 1, wherein the update message further comprises a domain identifier, a hash group identifier, and an HC identifier, and wherein the HC identifier is directly associated with the host domain.

8. A network element (NE) configured to operate in an information centric network (ICN), comprising:
   a processor configured to create a minimum spanning tree for an overlay cluster to which the NE is assigned within a host domain, the minimum spanning tree being a data structure indicating a path by which data is transferred within the overlay cluster, and the minimum spanning tree comprising a root corresponding to the NE and a plurality of member nodes assigned to the overlay cluster; and
   a transmitter coupled to the processor and configured to:
      broadcast a hash cluster setup (HCS) message to the member nodes based on the minimum spanning tree, the HCS message comprising source path routing information for the overlay cluster and hop limit values corresponding to distances within the ICN between the NE and each of the member nodes; and
      distribute, via pre-constructed overlay paths, an update message to a plurality of Head Controllers (HCs) assigned to other host domains.

9. The NE of claim 8, wherein the processor is further configured to assign one of the member nodes to another overlay cluster based on an efficiency of communication between the members nodes and other NEs with the host domain.

10. The NE of claim 8, wherein the processor is further configured to partition the overlay cluster into a local overlay cluster, wherein the overlay cluster is a global overlay cluster.

11. The NE of claim 8, wherein the update message comprises published namespaces for the overlay cluster.

12. The NE of claim 8, further comprising a receiver coupled to the processor and configured to receive, via the pre-constructed overlay paths, published namespaces for overlay clusters within the other host domains for the HCs assigned to the other host domains.

13. The NE of claim 8, wherein the update message further comprises a domain identifier, a hash group identifier, and an HC identifier, and wherein the HC identifier is directly associated with the host domain.

14. An apparatus implemented as a network element (NE), comprising:
   a memory storage comprising instructions; and one or more processors in communication with the memory storage, wherein the one or more processors execute the instructions to:
  create a minimum spanning tree for an overlay cluster to which the NE is assigned within a host domain, the minimum spanning tree being a data structure indicating a path by which data is transferred within the overlay cluster, and the minimum spanning tree comprising a root corresponding to the NE and a plurality of member nodes assigned to the overlay cluster;
  broadcast a hash cluster setup (HCS) message to the member nodes based on the minimum spanning tree, the HCS message comprising source path routing information for the overlay cluster and hop limit values corresponding to distances within the information centric network (ICN) between the NE and each of the member nodes; and
  distribute, via pre-constructed overlay paths, an update message to a plurality of Head Controllers (HCs) assigned to other host domains, wherein the update message comprises published namespaces for the overlay cluster.

15. The apparatus of claim 14, wherein the one or more processors further execute the instructions to assign one of the member nodes to another overlay cluster based on an efficiency of communication between the members nodes and other NEs with the host domain.

16. The apparatus of claim 14, wherein the one or more processors further execute the instructions to partition the overlay cluster into a local overlay cluster, wherein the overlay cluster is a global overlay cluster.

17. The apparatus of claim 14, wherein the published namespaces are distributed in a plurality of batches.

* * * * *